US012705972B2

(12) United States Patent
Haynes et al.

(10) Patent No.: US 12,705,972 B2
(45) Date of Patent: Aug. 11, 2026

(54) GEOGRAPHIC ADDRESSING OF FIELD EQUIPMENT

(71) Applicant: Aclara Technologies, LLC, St. Louis, MO (US)

(72) Inventors: David Donald Haynes, St. Peters, MO (US); Robert W. Richardson, St. Charles, MO (US); Peggy Rose Devereaux, St. Louis, MO (US)

(73) Assignee: Aclara Technologies LLC, St. Louis, MO (US)

( * ) Notice: Subject to any disclaimer, the term of this patent is extended or adjusted under 35 U.S.C. 154(b) by 0 days.

(21) Appl. No.: 17/521,315

(22) Filed: Nov. 8, 2021

(65) Prior Publication Data

US 2022/0148415 A1 May 12, 2022

Related U.S. Application Data

(60) Provisional application No. 63/110,690, filed on Nov. 6, 2020.

(51) Int. Cl.

| | |
|---|---|
| ***G08C 17/02*** | (2006.01) |
| ***G06F 3/0484*** | (2022.01) |
| ***H04L 12/18*** | (2006.01) |
| ***H04L 51/222*** | (2022.01) |
| ***H04W 4/021*** | (2018.01) |
| *H04L 101/69* | (2022.01) |

(52) U.S. Cl.

CPC ........... *G08C 17/02* (2013.01); *G06F 3/0484* (2013.01); *H04L 12/1845* (2013.01); *H04L 51/222* (2022.05); *H04W 4/021* (2013.01); *H04L 2101/69* (2022.05)

(58) Field of Classification Search

CPC ..... G08C 17/02; G06F 3/0484; G06F 3/0482; G06F 3/04842; H04M 1/72409; H04L 12/1845; H04L 51/222; H04L 2101/69; H04W 40/20; H04W 4/021; H02J 13/00006; H02J 2203/00; H02J 2203/10; H02J 2203/20

See application file for complete search history.

(56) References Cited

U.S. PATENT DOCUMENTS

| | | | | |
|---|---|---|---|---|
| 4,998,095 A * | 3/1991 | Shields | ................ | G08B 25/016 340/8.1 |
| 8,838,282 B1 * | 9/2014 | Ratliff | ................ | H04L 12/2816 709/201 |

(Continued)

FOREIGN PATENT DOCUMENTS

| | | | |
|---|---|---|---|
| EP | 3 352 421 | A1 | 7/2018 |
| WO | 2020/072637 | A1 | 4/2020 |

OTHER PUBLICATIONS

PCT/US2021/58431 International Search Report and Written Opinion dated Jan. 31, 2022 (15 pages).

(Continued)

*Primary Examiner* — Patrick F Riegler

(74) *Attorney, Agent, or Firm* — Michael Best & Friedrich LLP

(57) ABSTRACT

A product and method for addressing field equipment is provided. A unit of addressable field equipment considers itself selected or addressed and becomes receptive to a commanding message after determining that its determined coordinate pair lies within a geographical boundary.

12 Claims, 6 Drawing Sheets

(56) References Cited

U.S. PATENT DOCUMENTS 9,778,063 B2 * 10/2017 Holden ................ G01C 21/367
10,405,133 B1 * 9/2019 Merjanian ............... H04W 4/90
10,650,248 B2 * 5/2020 Gutierrez ......... G08B 13/19671
10,652,699 B1 * 5/2020 Poer ..................... H04B 17/318
10,924,443 B1 * 2/2021 Clymer ................. H04L 67/306
2006/0100777 A1 5/2006 Staton et al.
2010/0004003 A1 1/2010 Duggal et al.
2010/0036608 A1 2/2010 Johnson et al.
2011/0255418 A1 * 10/2011 van Greunen .......... H04L 41/06
370/242
2012/0226757 A1 9/2012 McFarland et al.
2012/0317265 A1 * 12/2012 Das ...................... H05K 7/1498
709/224
2014/0004879 A1 * 1/2014 Matsushita ........... H04W 4/029
455/456.1
2016/0088546 A1 3/2016 Birch et al.
2017/0156124 A1 * 6/2017 Ashley, Jr. ............... G07C 9/28
2017/0188199 A1 * 6/2017 Ashley, Jr. ............. G06V 20/52
2017/0195188 A1 * 7/2017 Bennett ................. H04L 67/568
2017/0223809 A1 8/2017 Oliver et al.
2017/0354018 A1 12/2017 Kuenzler et al.
2018/0139821 A1 5/2018 Deshpande et al.
2018/0316416 A1 * 11/2018 Reis ......................... H01Q 3/02
2020/0005523 A1 * 1/2020 Brebner .............. G01S 5/02522
2020/0059776 A1 * 2/2020 Martin ................ G06F 3/04817
2020/0135005 A1 * 4/2020 Katz ..................... G06F 3/0486
2020/0267498 A1 * 8/2020 Draper .................. H04W 4/029
2021/0091568 A1 * 3/2021 Salerno ................... H02J 3/144
2021/0329438 A1 * 10/2021 Brooks ................... H04W 4/90
2021/0367913 A1 * 11/2021 Umapathy ............ H04L 51/226
2022/0070608 A1 * 3/2022 Brooks ................... H04W 4/12

OTHER PUBLICATIONS

European Search Report dated Jan. 18, 2024 for corresponding European Application No. 21890228.6.

R. P. Pantoni et al., “A Geocast Routing Algorithm Intended for Street Lighting System Based on Wireless Sensor Networks,” Industry Applications (Induscon), 2010 9th IEEE/IAS International Conference on, IEEE, Nov. 8, 2010 (Nov. 8, 2010), pp. 1-6.

European Patent Application No. 21 890 228.6, Examination Report dated Mar. 17, 2026.

* cited by examiner

GEOGRAPHIC ADDRESSING OF FIELD EQUIPMENT

RELATED APPLICATIONS

The present application claim priority to U.S. Patent Application No. 63/110,690, filed Nov. 6, 2020, the entire contents of which are hereby incorporated.

FIELD

The embodiments disclosed herein relate to methods and products for addressing field equipment.

BACKGROUND

Addressable units of field equipment may be determined and addressed so that the equipment is easier to identify and interact with.

SUMMARY

A product and method for addressing field equipment is provided. A geographic coordinate pair is determined for each of a plurality of units of addressable field equipment. The plurality of units of addressable field equipment are constructed and arranged to communicate with a headend via wired or wireless communication. The headend is configured to select or address a group of units of addressable field equipment from the plurality of units of addressable field equipment by transmitting an addressing message containing a set of coordinates and indicators defining a set of boundaries to the plurality of units of addressable field equipment. This addressing message may be transmitted to the units of addressable field equipment by the headend wirelessly or by wire. Each unit of addressable field equipment that receives the transmission determines whether its own determined coordinate pair lies within the boundaries indicated in the addressing message transmitted by the headend. Upon determining that its coordinate pair lies within the boundaries indicated in the addressing message transmitted by the headend, a unit of addressable field equipment considers itself selected or addressed and becomes receptive to a commanding message, including one or more executable commands, transmitted from the headend. In some embodiments, the addressing message and commanding message are transmitted by the headend as a single addressing and commanding message.

Other aspects of the technology will become apparent by consideration of the detailed description and accompanying drawings.

DETAILED DESCRIPTION

Figure 1:
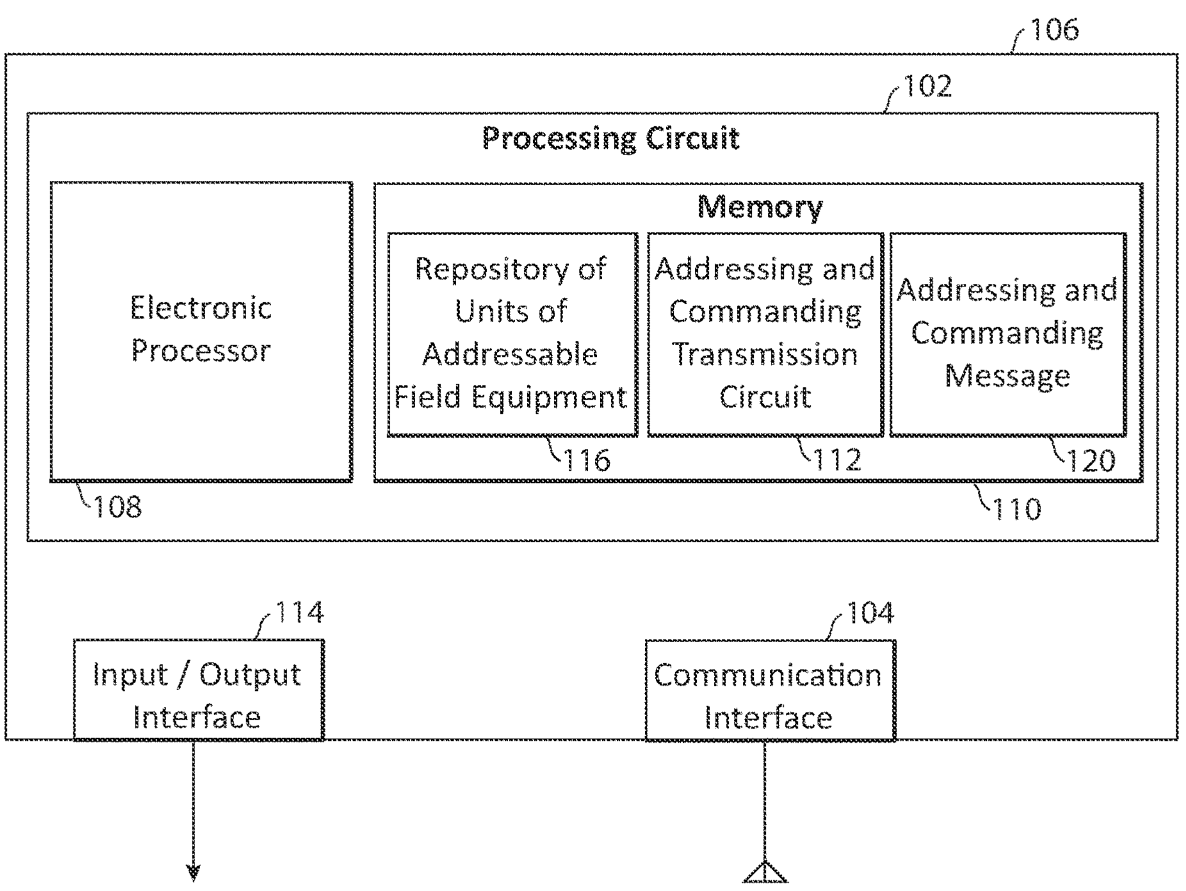
FIG. 1 depicts a block diagram of functioning components of a unit of a headend.

Before any embodiments of the application are explained in detail, it is to be understood that the application is not limited in its application to the details of construction and the arrangement of components set forth in the following description or illustrated in the following drawings. The application is capable of other embodiments and of being practiced or of being carried out in various ways.

Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. As used within this document, the word "or" may mean inclusive or. As a non-limiting example, if it we stated in this document that "item Z may comprise element A or B," this may be interpreted to disclose an item Z comprising only element A, an item Z comprising only element B, as well as an item Z comprising elements A and B.

As used herein, "addressable field equipment" may refer to a node in a power distribution system, a Data Concentrator Unit (DCU), an end point, an end device such as a connected lighting device, bridge device, gateway device, a power grid sensor with communication capabilities, a metering tool, a hand-held or hot-stick mounted tool used by a lineman, a vehicle, a radio (e.g. a one-way radio, a two-way radio) or other wireless communication devices. Addressable field units may also be referred to herein as "receiving unit", "the unit", or simply "unit." Initiating communication with an addressable unit of field equipment based on the unit's address may be referred to herein as "addressing" the addressable unit of field equipment.

A plurality of hardware and software-based devices, as well as a plurality of different structural components may be used to implement various embodiments. In addition, embodiments may include hardware, software, and electronic components or modules that, for purposes of discussion, may be illustrated and described as if many of the components were implemented solely in hardware. However, one of ordinary skill in the art, and based on a reading of this detailed description, would recognize that, in at least one embodiment, the electronic based aspects of the invention may be implemented in software (for example, stored on non-transitory computer-readable medium) executable by one or more processors. For example, "control units" and "controllers" described in the specification can include one or more electronic processors, one or more memory modules including non-transitory computer-readable medium, one or more input/output interfaces, one or more application specific integrated circuits (ASICs), and various connections (for example, a system bus) connecting the various components.

Referring now to FIG. 1, a block diagram of a headend 106 configured to address a unit of addressable field equipment, according to some embodiments, is shown. The headend 106 may be a central controller or computer, or any device capable of generating messages for transmission over wire or wirelessly (e.g. a broadcasting station, substation, or central controller). As shown in FIG. 1, the headend 106 includes a processing circuit 102, a communication interface 104, and an input/output interface 114. The processing circuit 102 includes an electronic processor 108 and a memory 110. The processing circuit 102 may be communicably connected to one or more of the communication interface 104 and the Input/output interface 114. The electronic processor 108 may be implemented as a programmable microprocessor, an application specific integrated circuit (ASIC), one or more field programmable gate arrays (FPGA), a group of processing components, or with other suitable electronic processing components.

The memory 110 (for example, a non-transitory, computer-readable medium) includes one or more devices (for example, RAM, ROM, flash memory, hard disk storage, etc.) for storing data and/or computer code for completing or facilitating the various processes, layers, and modules described herein. The memory 110 may include database components, object code components, components for communicating with a cloud storage or computing service, script components, or other types of code and information for supporting the various activities and information structure described in the present application. According to one example, the memory 110 is in electrical communication to the electronic processor 108 via the processing circuit 102 and may include computer code for executing (for example, by the processing circuit 102 and/or the electronic processor 108) one or more processes described herein. The memory 110 may be configured to store various processes, layers, and modules, which may be executed by the electronic processor 108 and/or the processing circuit 102. In some embodiments, the memory 110 includes an addressing and commanding transmission circuit 112. The addressing and commanding transmission circuit 112 is programmed to construct, in concert with the electronic processor 108, a message that defines a selection boundary for addressing units of addressable field equipment (not shown) by providing pertinent pieces of data to a receiving unit of addressable field equipment for interpretation and self-addressing by the receiving unit 206. Specifically, the pertinent pieces of data are generated for and arranged within the addressing and commanding message 120 by the headend 106 in a way that allows a receiving unit of addressable field equipment to determine the selection boundary. The phrase "self-addressing," as used herein, means a unit of addressable field equipment 116 determining whether it falls within this selection boundary.

In some embodiments, the memory 110 includes a repository of units of addressable field equipment 116. The headend 106 is configured to update the repository of units of addressable field equipment with status data pertaining to the units of addressable field equipment 206. In some embodiments, this status data is transmitted to the headend 106 by the units of addressable field equipment 116. The repository of units of addressable field equipment 116 may be held in the physical memory of the unit of addressable field equipment or may be a script or program for accessing or updating the repository of units of addressable field equipment 116 in a remote location such as a cloud storage service or a remote database. This access or update of the repository of units of addressable field equipment 116 may occur locally, in the case of the repository of units of addressable field equipment 116 residing in the local physical memory, or via the input/output interface 114 or communication interface 104 in the case of the repository of units of addressable field equipment 116 residing in remote storage. In some embodiments, when a addressing and commanding message 120 is received via communication interface 104, the unit of addressable field equipment stores the addressing and commanding message 120 in its memory for parsing into an addressing portion and a commanding portion for interpretation and execution by its electronic processor. This process is described in further detail below.

The communication interface 104 is configured to facilitate communication between the headend 106 and one or more external devices or systems, and/or one or more units of addressable field equipment. The communication interface 104 may be, or include, wireless communication interfaces (for example, antennas, transmitters, receivers, transceivers, etc.) for conducting data wireless transmission communications between the headend 106 and one or more external devices, such as a unit of addressable field equipment or another headend 106 or central controller. In some embodiments, the communication interface 104 utilizes a proprietary protocol for communicating with units of addressable field equipment. For example, the proprietary protocol may be an RF-based protocol configured to provide efficient and effective communication between the headend 106 and other devices. In other embodiments, other wireless communication protocols may also be used, such as cellular (3G, 4G, 5G, LTE, CDMA, etc.), Wi-Fi, LoRa, LoRaWAN, Z-wave, Thread, and/or any other applicable wireless communication protocol. In some embodiments, the communication interface 104 includes wired communication interfaces for conducting data communications between the headend 106 and one or more external devices, such as another unit of addressable field equipment or another headend 106 or central controller.

The Input/output interface 114 may be configured to interface directly with one or more devices, such as a power supply, a power monitor, substations, control centers, units of field equipment, external computing services or devices, etc. In one embodiment, the Input/output interface 114 may utilize general purpose I/O (GPIO) ports, analog inputs, digital inputs, etc.

Figure 2:
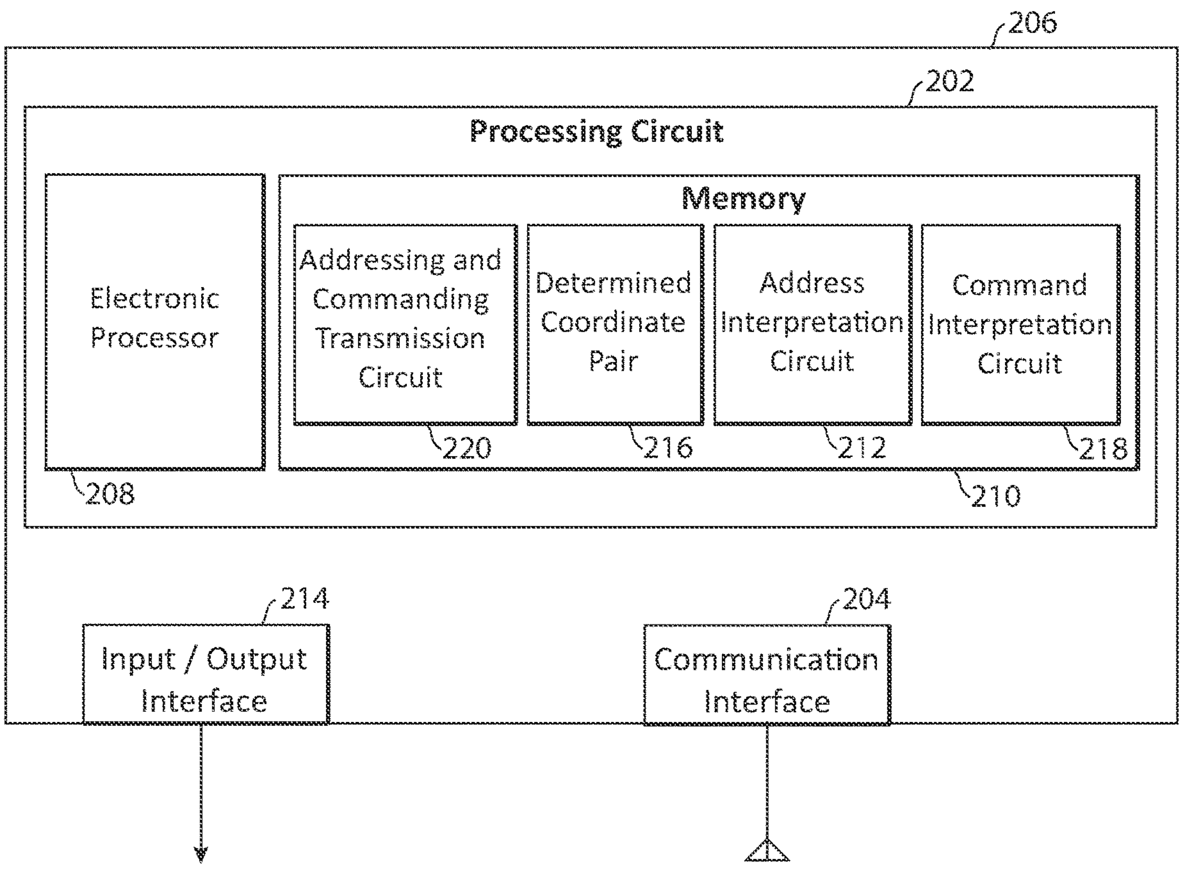
FIG. 2 depicts a block diagram of functioning components of a unit of addressable field equipment.

Referring now to FIG. 2, a block diagram of a unit of addressable field equipment 206, according to some embodiments, is shown. The unit 206 may be a standalone device, or may be a part of one or more devices, such as power meters, switchgear, a connected lighting device (e.g. a smart lighting device), etc. As shown in FIG. 2, the unit 206 includes a processing circuit 202, a communication interface 204, and an input/output interface 214. The processing circuit 202 includes an electronic processor 208 and a memory 210. The processing circuit 202 may be communicably connected to one or more of the communication interfaces 204 and the Input/output interface 214. The electronic processor 208 may be implemented as a programmable microprocessor, an application specific integrated circuit (ASIC), one or more field programmable gate arrays (FPGA), a group of processing components, or with other suitable electronic processing components.

The memory 210 (for example, a non-transitory, computer-readable medium) includes one or more devices (for example, RAM, ROM, flash memory, hard disk storage, etc.) for storing data and/or computer code for completing or facilitating the various processes, layers, and modules described herein. The memory 210 may include database components, object code components, script components, or other types of code and information for supporting the various activities and information structure described in the present application. According to one example, the memory 210 is communicably connected to the electronic processor 208 via the processing circuit 202 and may include computer code for executing (for example, by the processing circuit 202 and/or the electronic processor 208) one or more processes described herein.

The communication interface 204 is configured to facilitate communication between the unit of addressable field equipment 206 and one or more external devices or systems, a headend 106, or one or more other units of addressable field equipment 206. The communication interface 204 may be, or include, wireless communication interfaces (for example, antennas, transmitters, receivers, transceivers, etc.) for conducting data communications between the unit of addressable field equipment 206 and one or more external devices, such as another unit of addressable field equipment 206 or a headend 106. In some embodiments, the communication interface 204 utilizes a proprietary protocol for communicating with other units of addressable field equipment 206 or a headend 106 or central controller. For example, the proprietary protocol may be an RF-based protocol configured to provide efficient and effective communication between the unit of addressable field equipment 206 and other devices. In other embodiments, other wireless communication protocols may also be used, such as cellular (3G, 4G, 5G, LTE, CDMA, etc.), Wi-Fi, LoRa, LoRaWAN, Z-wave, Thread, and/or any other applicable wireless communication protocol. In some embodiments, the communication interface 204 includes wired communication interfaces for conducting data communications between the unit of addressable field equipment 206 and one or more external devices, such as another unit of addressable field equipment 206 or a headend 106.

The Input/output interface 214 may be configured to interface directly with one or more devices, such as a power supply, a power monitor, other units of field equipment, etc. In one embodiment, the Input/output interface 214 may utilize general purpose I/O (GPIO) ports, analog inputs, digital inputs, etc.

In some embodiments, the memory 210 stores a determined coordinate pair 216, indicating an assignment of a geographical location or placement of the unit of addressable field equipment 206. The determined coordinate pair 216 is stored in memory 210 of the unit of addressable field equipment 206 during fabrication at a production facility, by an installing engineer or technician during installation, or is stored in memory after installation of the unit 206. For example, after the unit of addressable field equipment 206 is installed, a headend 106 may transmit an addressing message containing a coordinate pair to the unit of addressable field equipment 206. As another example. The unit of addressable field equipment 206 may deduce its own determined coordinate pair 216 via a GPS unit, wifi positioning, cell tower triangulation, radio tower localization, or some other method or circuitry.

The unit of addressable field equipment 206 might be able to derive an approximate geographic position based upon measurements relative to radio towers within its own RF network. The unit of addressable field equipment 206 stores the coordinate pair contained in the addressing message as the determined coordinate pair 216. Similarly, after the unit of addressable field equipment 206 is installed, a field technician may manually input a coordinate pair for storage as the determined coordinate pair 216 using a user interface (e.g. a graphical interface) or by using a trusted short-range communications protocol. The memory 210 also includes an address interpretation circuit 212. The address interpretation circuit 212 is adapted to confirm, in concert with the electronic processor 208, that the unit of addressable field equipment 206 is located within a selection boundary defined by data containing in a received addressing and commanding message 220 transmitted by a headend 106 or central controller in an addressing message. To that end, the headend 106 may be equipped with or provide remote service to software for indicating the boundaries of selection for addressing units of addressable field equipment 206.

As described above, the memory 210 may be configured to store various processes, layers, and modules, which may be executed by the electronic processor 208 and/or the processing circuit 202. For example, the memory 210 includes a command interpretation circuit 218 operable by the electronic processor 208. The electronic processor 208 is configured to receive an addressing and commanding message 220 including a commanding portion, transmitted by a headend 106 or central command or from another unit of addressable field equipment 206 via the communication interface 204 or input/output interface 214. Using the command interpretation circuit 218, the electronic processor 208 is configured to interpret the received addressing and commanding message 220 from a headend 106 or central controller, interpret the commanding portion, and trigger the appropriate components or elements of the unit of addressable field equipment 206 to execute the commands found in the interpreted command portion.

Figure 3:
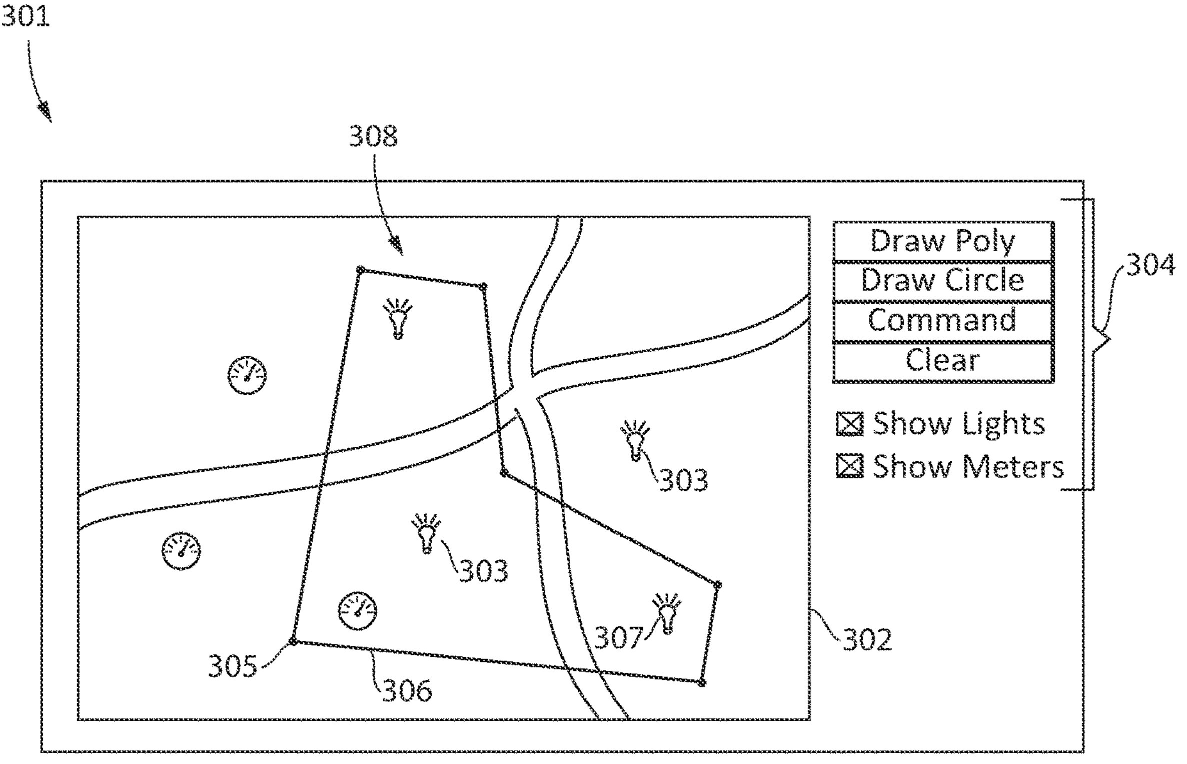
FIG. 3 depicts a graphical user interface for selecting and interacting with units of addressable field equipment.

Referring now to FIG. 3, a graphical user interface 301 for addressing a group of units of addressable field equipment 206 is shown. The graphical user interface 301 shows an aerial map 302 displaying a number of icons 303, each representing and associated with an addressable unit of addressable field equipment 206. Each of the icons 303 is placed at a location on the aerial map 302 corresponding to the determined coordinate pair 216 of each unit of addressable field equipment 206 represented. A number of interactive elements 304 allow a user to interact with the icons 303 (e.g. via interaction with an electronic display) and thereby interact with the associated unit of addressable field equipment 206. In the embodiment shown, a user may select a drawing option (e.g. "draw poly") from the number interactive elements 304, and begin to draw points 305 to create an enclosed shape 308 (e.g. as a graphical representation of a selection boundary) on the aerial map 302 by pointing and click or tapping on the user interface 301. Each of the drawn points 305 are correlated to pairs of geographical coordinates associated with the positions of the drawn points 305 on the aerial map 302. Lines 306 or curves (in the case of a circle) are automatically drawn between the points 305, to assist the user in identifying which icons 303 and associated units of addressable field equipment 206 are enclosed by the drawn points 305.

Software underlying the graphical user interface 301 is configured to determine which icons 303 lie within the enclosed shape 308, and in turn which units of addressable field equipment 206 are intended to be addressed in a transmission from via the headend 106. In this way, a user may indicate which units of addressable field equipment 206 it would like to identify as units to be addressed 307 in preparation for a follow-up executable command. In this example, a command option (e.g. "command") may be selected from the number of interactive elements 304 to initiate a presentation of executable commands for selection and transmission to the unit to be addressed 307. For example, a user may draw lines 306 or curves resembling a triangle (not shown). The lines 306 or curves may not form a fully closed shape but generally enclose a number of icons 303. After enclosing the icons 303 in the enclosing shape 308 generally formed by the lines 306 or curves, the user may address and command the units of addressable field equipment 206 associated with the enclosed icons 303 by choosing an address or command option from the menu of interactive elements 304 in the graphical user interface 301.

Software underlying the graphical user interface detects the type of the units to be addressed 307 and presents the user with a variety of options for executable commands interpretable by every type of unit to be addressed 307. In the example shown, a polygon has been drawn enclosing a number of icons 303 representing connected lighting devices and connected metering devices (e.g. a smart metering device). The software underlying the graphical user interface determines a list of executable commands (not shown) that may be interpreted by connected lighting devices as well as connected metering devices and present them to the user for selection. This selection is then be communicated to the headend 106 and transmitted (e.g. direct transmission, broadcast, multicast, etc.) to the units to be addressed 307 by the headend 106. Additionally, the software underlying the graphical user interface 301 may determine separate lists of executable commands that may be interpreted by the units to be addressed 307 with items selectable by the user for broadcast by the headend 106—one list for the connected lighting devices, and one list for the connected metering devices. The user may select at least one of the executable commands listed and elect to transmit it in an addressing and commanding message 120, 220 to one or more units of addressable field equipment 206 such as the units to be addressed 307.

Figure 4:
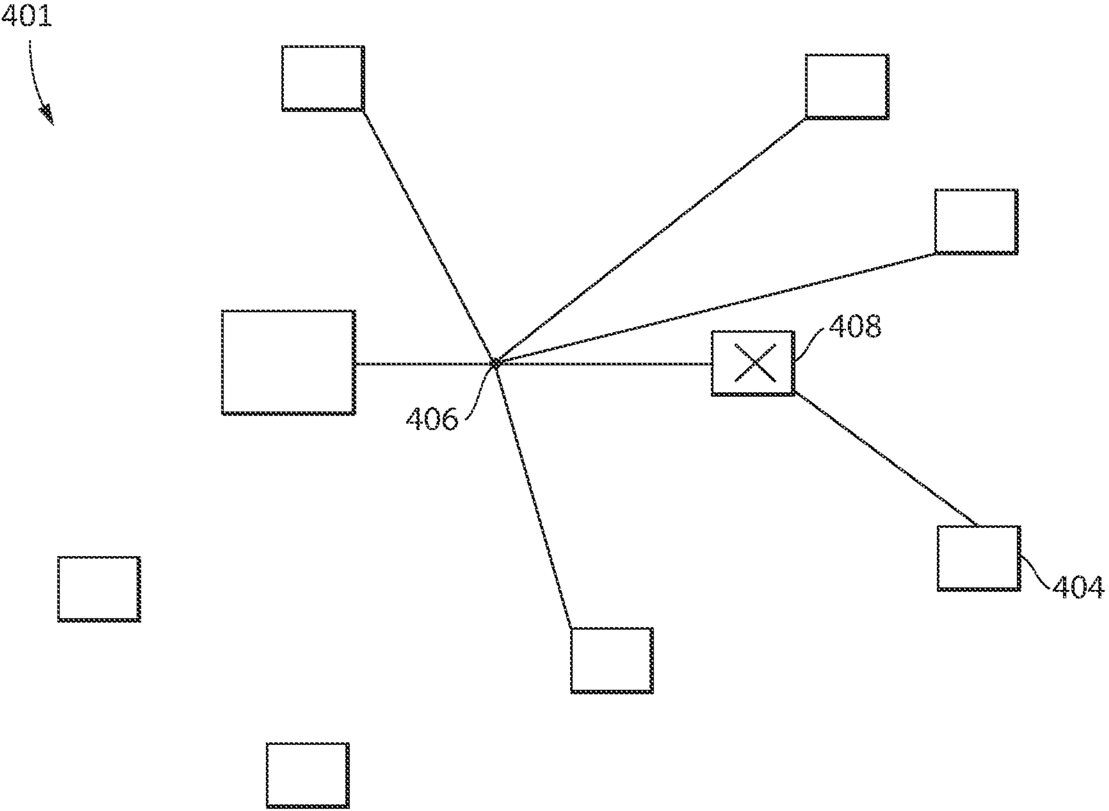
FIG. 4 depicts a schematic diagram of a head end addressing units of addressable field equipment.

Referring now to FIG. 4, a scheme 401 for a control center 406 addressing units of addressable field equipment 404, 408 is shown. In the example shown, the control center 406, such as a headend 106, transmits an addressing and commanding message 120, 220 to the addressable units of field equipment 206 (e.g. via direct transmission, broadcast, multicast, etc.) As described above, the control center 406, constructs an addressing portion and a commanding portion of the transmitted addressing and commanding message 120, 220 and transmits it to the units to be addressed 307. Some units of addressable field equipment 404 may receive the addressing and commanding message 120, 220 directly from the control center 406. In some cases, units to be addressed 307 in the addressing and commanding message 120, 220 may receive the addressing and commanding message 120, 220 indirectly, as it is echoed by units of addressable field equipment 408 that were not addressed in the addressing and commanding message 120, 220, as well as by units of addressable field equipment 404 that were addressed in the addressing and commanding message 120, 220. In some cases, the control center 406, such as a headend 106, broadcasts the addressing portion and the commanding portion as separate messages (e.g. an addressing message and a commanding message) but the separate messages may be correlated by the electronic processor 208 on the basis of transmission IDs contained in the messages (e.g. an addressing transmission ID, a commanding transmission ID), or by some other correlation based on message origin, size, signature, timing, or content. In this way, the addressing and commanding portions of the separate messages may be interpreted asynchronously by electronic processor 208 but still embody the methods, functions, and described herein.

Figure 5:
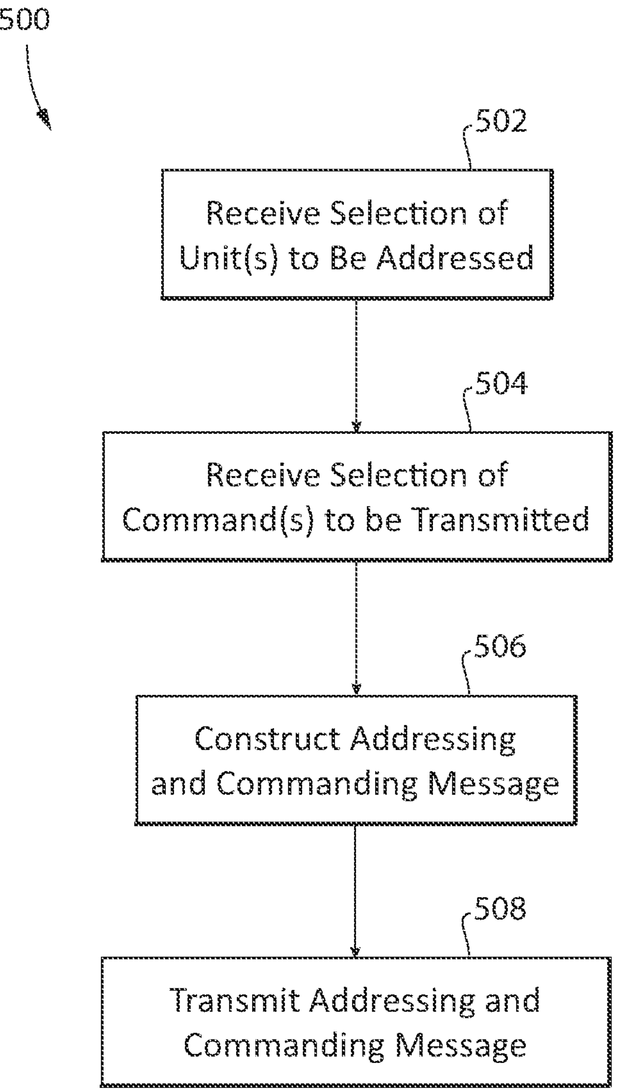
FIG. 5 depicts a flowchart for addressing units of addressable field equipment with a headend.

Referring now to FIG. 5, a flowchart 500 for a method of addressing field equipment by coordinates with a headend 106 is shown. At block 502, a headend 106 receives, via input/output interface 114, from software at the headend 106 or at a remote source, a selection of units to be addressed 307, 404. This selection may come in the form of a set of coordinate pairs, the boundaries of which enclose at least one unit of addressable field equipment 206. The selection of units to be addressed 307, 404, may also include an indicator (e.g. a boundary indicator) of how the boundary of the selection coordinate pairs is to be interpreted from the coordinate pairs by the headend 106. Based on its interpretation of the selection coordinate pairs, the headend 106 constructs the addressing portion of an addressing and commanding message 120, 220. For example, selection may be in the form of a selection of coordinate pairs translated from points 305, lines 306, or curves drawn on a graphical user interface 301 and enclosing a number of icons 303 displayed on the graphical user interface 301, as described above, along with an indicator that the boundary of the selection coordinate pairs is to be interpreted by the headend 106 as a polygon. The headend 106 uses the addressing and commanding transmission circuit 112 via electronic processor 108 to insert data sufficient to indicate the selection of units to be addressed 307, 404 into the addressing portion of the addressing and commanding message 120, 220 when it is constructed by the headend 106 at block 506.

At block 504, the headend 106 receives, via input/output interface 114, from software at the headend 106 or via a remote source, a selection of executable commands to be transmitted to units to be addressed 307, 404. As described above, a selection of executable commands to be transmitted to the units to be addressed 307, 404, may be provided by a graphical user interface 301 at the headend 106 or communicated to the headend 106 from a remote source. The executable commands identified in the selection of executable commands are inserted by electronic processor 108 via addressing and commanding transmission circuit 112 of the headend 106, along with the selection of units addressable field equipment 206, into the addressing and commanding message 120, 220 when it is constructed by the headend 106 at block 506.

At block 506, the addressing and commanding message 120, 220 is constructed by the headend 106. In response to receiving the selection of units to be addressed 307, 404 and the selection of executable commands via input/output interface 114, the headend 106 determines from the received selections how the addressing and commanding message 120, 220 should be constructed. For example, if the selection of units to be addressed 307, 404 are selected using the "draw circle" interactive element 304, the addressing portion of the addressing and commanding message 120, 220 constructed by the headend 106 may contain a set of two coordinate pairs, and an indicator that the selection boundary forms a circle. The headend 106 may determine the distance between the two coordinate pairs and from the distance derive a midpoint and radius of the circle. As another example, in constructing the addressing portion of the addressing and commanding message 120, 220 using the addressing and commanding transmission circuit 112, the headend 106 may insert an indicator that the selection boundary forms a circle, a single coordinate pair (e.g. a center point), and a radius value. As yet another example, if the selection boundary forms a polygon, the addressing portion of the addressing and commanding message 120, 220 constructed by the headend 106 may contain an indicator that the selection boundary forms a polygon, and a set of coordinate pairs. As an additional example, if the selection boundary forms an ellipse, the addressing portion of the of the addressing and commanding message 120, 220 constructed by the headend 106 may contain an indicator that the selection boundary forms an ellipse, the coordinate pairs of the two foci of the ellipse, and in some cases the distance between the two foci of the ellipse. In other, similar cases, the addressing portion may not contain the distance between the two foci, and the headend 106 may determine the distance between the two foci. The headend 106, using electronic processor 108, also inserts the selected executable commands into the addressing and commanding message 120, 220 for execution by a unit of addressable field equipment 206, using the addressing and commanding transmission circuit 112.

At block 508, after being constructed, the addressing and commanding message 120, 220 is transmitted by the headend 106, via communication interface 104, to a unit of addressable field equipment 206—specifically, to a unit to be addressed 307. In some embodiments, the coordinate pairs of the addressing portion of the addressing and commanding message 120, 220 are correlated by the receiving units of addressable field equipment 206 to other data contained in the addressing and commanding message 120, 220. This correlation enables the receiving unit of addressable field equipment 206 to determine whether its determined coordinate pair 216 lies within the selection boundary defined by the addressing portion of the addressing and commanding message 120, 220. This process will be described in further detail below.

Figure 6:
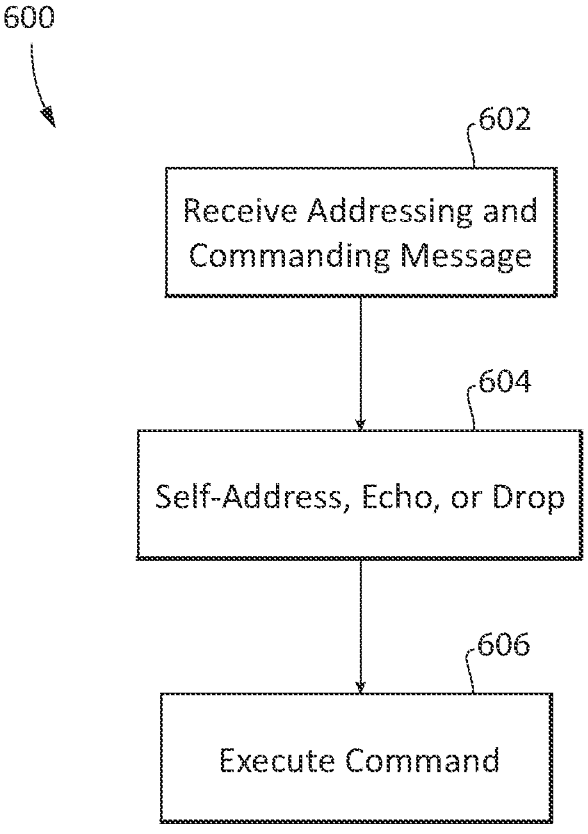
FIG. 6 depicts a flowchart for self-addressing by a unit addressable of field equipment upon receipt of coordinates from a headend.

Referring now to FIG. 6, a flowchart for self-addressing by a unit of addressable field equipment 206 upon receipt of an addressing and commanding message 120, 220 from a headend 106 is shown. At block 602, the unit 206 to be addressed 307 receives the addressing and commanding message 120, 220, directly from a headend 106 or echoed (e.g. retransmitted) by another unit of addressable field equipment 206, and parses the addressing and commanding message 120, 220 into an addressing portion and commanding portion. In some cases, the unit of addressable field equipment 206 receives an addressing message and commanding message separately. That is, sometimes the headend 106 communicates the addressing and commanding message 120, 220 as two separate messages—an addressing message and a commanding message. In such cases, the addressing portion, as described above, is inserted into an addressing message by the headend 106. Similarly, the commanding portion, as described above, is inserted into a commanding message by the headend 106. Thus, as used herein and as shown in the figures, "addressing and commanding message" can mean a single message containing both an addressing portion and a commanding portion, or separate addressing messages containing addressing portions and commanding messages containing commanding portions.

At block 604, the receiving unit of addressable field equipment 206 uses the address interpretation circuit 212 and electronic processor 208 to confirm that it has been addressed by the addressing portion of the addressing and commanding message 120, 220. The address interpretation circuit 212 and electronic processor 208 perform this confirmation by correlating the determined coordinate pair 216 of the unit 206 to the boundary defined by the addressing portion contained in the received addressing and commanding message 120, 220, or separately an addressing message and a commanding message, transmitted by the headend 106. This communication by the headend 106 and subsequent confirmation by a unit 206 may each be referred to as "addressing" herein. If the receiving unit of addressable field equipment 206 determines, via its address interpretation circuit 212, that it is located within the selection boundary defined by the received addressing and commanding message 120, 220 (i.e. the unit of addressable field equipment 206 is addressed by the headend 106) the unit of addressable field equipment 206 uses the command interpretation circuit 218 to interpret a commanding portion included in the addressing and commanding message 120, 220 or received in a transmission received after the addressing and commanding message 120, 220 (e.g. a commanding message received after an addressing message). In some embodiments, the addressing and commanding message 120, 220 is received via the communications interface 204, for example, via the wireless communication protocols described above.

The address interpretation circuit 212 and electronic processor 208 make the determination of whether the unit of addressable field equipment 206 is addressed in the received addressing and commanding message 120, 220 by correlating the determined coordinate pair 216 of the unit 206 to the selection boundary defined by data containing in the received addressing and commanding message 120, 220 transmitted by the headend 106. For example, if the addressing and commanding message 120, 220 indicates that the selection boundary forms a circle and contains two coordinate pairs, the unit 206 determines the distance and the midpoint between the two coordinate pairs. The receiving unit of addressable field equipment 206 or unit to be addressed 307, 404, then plugs its own determined coordinate pair 216, the coordinates of the midpoint, and half of the distance into an equation for determining whether a the determined coordinate pair 216 is within a circle centered at the coordinates of the midpoint and having a radius of half of the distance. As another example, if the addressing and commanding message 120, 220 indicates that the selection boundary forms a circle, and contains a single coordinate pair, and a radius value, the receiving unit of addressable field equipment 206 simply determines whether the determined coordinate pair 216 lies within the circle defined within the addressing and commanding message 120, 220 in a fashion similar to the example described above. In some cases, the receiving unit 206 may optimize a selection of coordinate pairs 216 by translating the coordinate pairs into equations for lines 306. For example, if the received addressing and commanding message 120, 220 indicates that the selection boundary forms a polygon, and is accompanied by a set of coordinate pairs, the receiving unit of addressable field equipment 206 determines, via electronic processor 208 using the address interpretation circuit 212, the equations of lines 306 forming an enclosed shape 308 between contiguous coordinate pairs. In some embodiments, the addressing and commanding message 120, 220 itself contains equations for lines 306 defining the polygon. Once the equations of the lines 306 defining the polygon are determined or received, the receiving unit of addressable field equipment 206 draws a determination line through the polygon, in a single direction, starting at the determined coordinate pair 216. The receiving unit of addressable field equipment 206 then determines whether the determination line is intersected and equal or odd amount of times by the lines 306 defining the polygon. If the determination line is intersected an odd amount of times, the receiving unit of addressable field equipment 206 determines that the determined coordinate pair 216 lies within the polygonal selection boundary, enclosed shape 308. If, however, the determination line is intersected an even number of times, the receiving unit of addressable field equipment 206 determines that the determined coordinate pair 216 lies outside of the polygonal selection boundary, enclosed shape 308. If the receiving unit of addressable field equipment 206 determines, via its address interpretation circuit 212, that its determined coordinate pair 216 is located within the selection boundary defined by data contained in the received addressing and commanding message 120, 220, the receiving unit of addressable field equipment 206 uses the command interpretation circuit 218 to interpret an executable command in the same transmission containing the received addressing and commanding message 120, 220 or received in a transmission following the received addressing and commanding message 120, 220.

In some embodiments, the receiving addressable unit of field equipment 206 determines whether its determined coordinate pair 216 lies near a selection boundary, a coordinate pair, or a line formed by multiple coordinate pairs within a margin of error. For example, if a coordinate pair is received by an addressable unit of field equipment 206 having a margin of error of 50 feet, and the coordinate pair lies 50 feet or less from the receiving addressable unit of field equipment 206, the receiving addressable unit of field equipment 206 would determine itself addressed. As another example, if the received addressing and commanding message 120, 220 indicates that the selection boundary forms a line, and is accompanied by a couple of coordinate pairs, the receiving unit of addressable field equipment 206 determines, via electronic processor 208 using the address interpretation circuit 212, an equation for a line formed between the couple of coordinate pairs. The receiving addressable unit of field equipment 206 may determine that its determined coordinate pair 216 lies within a margin of error of the line formed between the couple of coordinate pairs and therefore determine itself as addressed by the addressing and commanding message 120, 220. This margin of error may be adjustable, and may be adjustable via the headend 106 or at the addressable unit of field equipment 206.

In some embodiments, the headend 106 receives a set of coordinate pairs for addressing units of addressable field equipment 206, but the set of coordinate pairs lacks an indicator of selection boundary. In such cases, the headend 106 may determine, by passing the received set of coordinate pairs through an optimization algorithm, that the most efficient way to address the units to be addressed 307 is for the headend 106 to draw a polygon around the targets, or a line including a margin of error near the units to be addressed 307. The headend 106 then constructs an addressing and commanding message 120, 220, and in some cases an addressing message alone, based upon the identified optimization, resulting in the headend 106 issuing, for example, an addressing and commanding message 120, 220 indicating a polygon or line and containing an optimization of the originally received coordinate pairs.

In some cases, the unit of addressable field equipment 206 interpreting the addressing and commanding message 120, 220 determines that the received addressing and commanding message 120, 220 is not intended to address the receiving unit 206. In such cases, the receiving unit 206 may echo the addressing and commanding message 120, 220 so that the probability of the addressing and commanding message 120, 220 reaches the unit 206 that the addressing and commanding message 120, 220 is intended to address is increased. In other cases, after determining that the received addressing and commanding message 120, 220 is not intended to address the receiving unit of addressable field equipment 206, the receiving unit of addressable field equipment 206 drops the addressing and commanding message 120, 220 without echoing it.

At block 606, after the receiving unit of addressable field equipment 206 determines, via its address interpretation circuit 212, that its determined coordinate pair 216 is located within the selection boundary defined by data contained in the received addressing and commanding message 120, 220, the receiving unit 206 executes the commanding portion of the received addressing and commanding message 120, 220. For example, if the receiving unit 206 is a connected lighting device, and the commanding portion of the received addressing and commanding message 120, 220 contains an "off" command properly constructed to be interpreted by the lighting device without error, the connected lighting device will execute the "off" command and will turn off. In some cases, the command portion of the addressing and commanding message 120, 220 may be properly constructed for a unit 206 of another type, or contain a command that the receiving unit 206 in incapable of performing. In such cases, the receiving unit of addressable field equipment 404 that was addressed may drop the addressing and commanding message 120, 220 without executing it.

In some cases, after executing the executable commands found in the commanding portion of the received addressing and commanding message 120, 220, the receiving unit of addressable field equipment 404 that was addressed transmits a confirmation message to the headend 106, indicating that the commanding portion of the transmitted addressing and commanding message 120, 220 was executed. In turn, the headend 106 may update the repository of units of addressable field equipment 116 to indicate the updated state of the addressable units of field equipment 206 after executing the commanding portion of the received addressing and commanding message 120, 220.

In some embodiments, the unit of addressable field equipment 206 is a vehicle in a mobile fleet. For example, the unit of addressable fuel to equipment 206 may be an automobile or an aircraft in the emergency in an emergency response team. In such cases, the Automobiles or aircraft may be equipped with GPS units that allow a call center to actively track their position on a map. Shut up operator at the call center may draw selection boundary around vehicles to be addressed by the call center. The call center may act as the headend 106 disclosed herein, and transmit communications to the vehicles or aircraft within the selection boundary.

It is contemplated that the methods and systems disclosed herein could also be used for targeted testing of the units of addressable field equipment 206. For example, A network operator or lineman may wish to run a test on all of the devices in the proximity of a particular location. The operator or lineman may use the user interface 301 create a circle shaped selection boundary around the location with the center point of the circle being the latitude and longitude of the location. For example, the user interface 301 may be configured to render an aerial or geographical map of an area in which units of addressable field equipment 206 reside. The operator may point and click, tap, or drag the circular selection boundary around the units of addressable field equipment 206 that the lineman or operator wishes to address. The headend may address the units addressable field equipment within the selection boundary and communicate a testing command to the selected units according the methods and systems described herein. Similarly, the addressed units may respond to the headend, as described above, after executing the testing command.

It is also contemplated that the methods and systems described herein may be used in conjunction with an automated warning system. For example, an automated system may be configured to use the methods or systems described herein to draw selection boundary around addressable units of field equipment in areas recently affected or soon to be affected by a certain phenomenon.

Various features and advantages of the invention are set forth in the following claims.

The invention claimed is:

1. A headend comprising:

a transceiver configured to transmit and receive messages to and from one or more units of addressable field equipment in a power distribution network; and, an addressing and commanding transmission circuit configured to:

receive an indication of the one or more units of addressable field equipment in the power distribution network to be addressed;

receive a selection of one or more commands to be executed by the one or more units of addressable field equipment to be addressed;

construct an addressing and commanding message with an addressing portion including one or more coordinate pairs and a boundary indicator for the one or more coordinate pairs, and with a commanding portion including a selection of one or more executable commands from a list of commands generated by the headend and associated with a type of the one or more units of addressable field equipment;

transmit the addressing and commanding message via the transceiver to the one or more units of addressable field equipment configured to confirm, based upon a geographical location of the one or more units of addressable field equipment, whether the one or more units of addressable field equipment is located within a selection boundary indicated in the addressing and commanding message; and receive a confirmation message containing data detailing which of the commands were successfully executed by at least one of the one or more units of addressable field equipment, wherein the geographical location of the one or more units of addressable field equipment is stored in memory of the one or more units of addressable field equipment during fabrication at a production facility, or by an installing engineer or technician during installation, wherein the addressing and commanding transmission circuit is further configured to optimize the received indication of one or more units of addressable field equipment to be addressed by determining, at the headend, that the addressing and commanding message can be constructed by translating the received indication of one or more units of addressable field equipment to the one or more coordinate pairs forming the selection boundary shaped like a polygon encompassing the units of addressable field equipment.

2. The headend of claim 1, wherein receiving the indication of one or more units of addressable field equipment to be addressed includes receiving the indication via the transceiver from software including a user interface accepting as input a selection of one or more coordinate pairs on a geographical map.

3. The headend of claim 1, wherein the received indication of one or more units of addressable field equipment to be addressed is communicated from a source external to the headend and received at the transceiver.

4. The headend of claim 3, wherein the source external to the headend is a metering tool.

5. The headend of claim 1, wherein the headend is further configured to update a repository of units of addressable field equipment with status data received from addressable units of field equipment via the transceiver.

6. A method comprising:

receiving, at an electronic processor of a headend of a power distribution network, an indication of one or more units of addressable field equipment in the power distribution network to be addressed;

translating the received indication of one or more units of addressable field equipment to a set of coordinate pairs forming a selection boundary shaped like a polygon encompassing the one or more units of addressable field equipment;

receiving, with the electronic processor, a selection of one or more executable commands from a list of commands generated by a headend and associated with a type of a unit of addressable field equipment;

constructing, with the electronic processor, one or more messages collectively including the set of coordinate pairs, the selection boundary, and the one or more executable commands, the one or more executable commands interpretable by the one or more units of addressable field equipment;

transmitting, with a transmitter, the one or more messages to the one or more units of addressable field equipment, and receiving, with a receiver, a confirmation message containing data detailing which of the one or more executable commands were successfully executed by the one or more units of addressable field equipment, wherein the one or more units of addressable field equipment is configured to confirm whether the one or more units of addressable field equipment is located within the selection boundary indicated in the addressing and commanding message based upon a geographical location of the one or more units of addressable field equipment, and wherein the geographical location of the one or more units of addressable field equipment is stored in memory of the one or more units of addressable field equipment during fabrication at a production facility, or by an installing engineer or technician during installation.

7. The method of claim 6, where the one or more messages include an addressing message and a commanding message, the method further comprising:

inserting an addressing transmission ID into the addressing message; and, inserting a commanding transmission ID into the commanding message.

8. The method of claim 6, further comprising:

presenting, with an electronic display, a graphical user interface including a rendering of a geographical map;

receiving, with the electronic processor, point and click or tap input on the rendering of the geographical map;

determining, with the electronic processor, the set of coordinate pairs based upon the point and click or tap input;

drawing, with the electronic processor, a graphical representation of the set of coordinate pairs on the rendering of the geographical map.

9. The method of claim 8, further comprising:

drawing, with the electronic processor, a graphical representation of the selection boundary on the rendering of the geographical map.

10. The method of claim 6, wherein the one or more units of addressable field equipment is self-addressing.

11. The method of claim 10, wherein the one or more units of addressable field equipment is a connected lighting device.

12. The method of claim 10, wherein the one or more units of addressable field equipment is a connected metering device.

* * * * *